(12) United States Patent
Mountassir (10) Patent No.: US 6,973,389 B1
(45) Date of Patent: Dec. 6, 2005

(54) METHOD OF OPTIMIZING PARAMETER VALUES IN A PROCESS OF PRODUCING A PRODUCT

(76) Inventor: M'Hammed Mountassir, 157 La Galene, Hull (CA) J8Z 2N3

( * ) Notice: Subject to any disclaimer, the term of this patent is extended or adjusted under 35 U.S.C. 154(b) by 0 days.

(21) Appl. No.: 09/980,163

(22) PCT Filed: Aug. 28, 2000

(86) PCT No.: PCT/CA00/00998

§ 371 (c)(1),
(2), (4) Date: Nov. 30, 2001

(87) PCT Pub. No.: WO01/18668

PCT Pub. Date: Mar. 15, 2001

Related U.S. Application Data (60) Provisional application No. 60/152,457, filed on Sep. 3, 1999.

(51) Int. Cl.[7] .......................... G06F 19/00; G06G 7/60
(52) U.S. Cl. ......................................... 702/22; 703/12
(58) Field of Search .................... 703/2, 4, 12; 702/22; 700/37, 53; 427/8

(56) References Cited

U.S. PATENT DOCUMENTS

| | | | |
|---|---|---|---|
| 4,368,509 A * | 1/1983 | Li ................................ 700/53 |
| 5,119,468 A | 6/1992 | Owens |
| 5,218,526 A | 6/1993 | Mozzo |
| 5,457,625 A | 10/1995 | Lim et al. |
| 5,500,795 A | 3/1996 | Powers et al. |
| 5,862,514 A * | 1/1999 | Huse et al. ................... 702/22 |
| 5,871,805 A * | 2/1999 | Lemelson ...................... 427/8 |
| 5,933,348 A | 8/1999 | Kurtzberg et al. |
| 6,056,781 A | 5/2000 | Wassick et al. |
| 6,151,565 A * | 11/2000 | Lobley et al. ................. 703/2 |
| 6,487,459 B1 * | 11/2002 | Martin et al. ................. 700/37 |

OTHER PUBLICATIONS

NIST, "Engineering Statistics handbook", Nov. 18, 2001.*

* cited by examiner

*Primary Examiner*—John S. Brusca (57) ABSTRACT

A method of optimizing parameter values in a process for producing a product, which process is essentially controlled by a set of parameters affecting a set of properties characterizing the product. The method uses an analytic hierarchy process (AHP) to associate a weight with each property according to its relative importance to obtain desired product characteristics. The method also uses parameter data and measured property data from a required number of experimental runs of the process, from which data property behavior relations between each property and the parameters are statistically established, which relations give estimated property values. Using the property weights, a process goal function is established, which is expressed in terms of weighted deviations between the estimated property values and the corresponding goal values for the properties. Finally, the process goal function is minimized in order to generate a set of optimal parameter values for the process.

26 Claims, 2 Drawing Sheets

METHOD OF OPTIMIZING PARAMETER VALUES IN A PROCESS OF PRODUCING A PRODUCT

This application claims priority of U.S. provisional patent application 60/152,457 filed Sep. 3, 1999.

BACKGROUND OF THE INVENTION

1. Field of the Invention

The invention relates to the process optimization field, and more particularly to a method of optimizing parameter values in a process of producing a product which is characterized by properties affected by the selected parameter values. This invention is applicable in different industries, such as the pharmaceutical, chemical, cosmetics, plastics, petrochemical, agriculture, metallurgy and food industries, as well as many other commercial and industrial applications.

2. Description of Prior Art

Processes for production of complex compositions such as those found in many pharmaceutical products generally require the mixing of many ingredients according to specific process parameters regarding formulation and production technology, to provide the product with properties at a level offering satisfactory performance according to predetermined specifications. In such complex production processes, it is not unusual that some process parameters involved exhibit interfering effects on the desired properties, further complicating the process design. Where possible, the designer may try to adapt the set of process parameters from known data derived from previous similar processes, and/or rely on conventional trial-and-error experimental schemes to optimize the set of process parameters values, in order to meet the product specifications. However, as the processes become more complex, optimization in such multidimensional space with high accuracy requirements turns out to be an extremely difficult task, even for the highly skilled designer. That limitation is particularly problematic in the design of pharmaceutical products, where one or more active substances mixed with a variety of excipients (e.g. carriers) must be produced in the form of a stable and highly effective standard delivery system such as a tablet, capsule, suspension, cream or injection, or even controlled release systems such as skin carriers and implants.

In the past years, many techniques have been developed to assist the process designer or formulator in optimizing values of parameters governing processes. These techniques aim at quantify existing relations between parameters and associated desired product performance characteristics. A conventional technique known as the Full Factorial Matrix (FFM) method consists of statistically deriving a behavior relations for the properties from a set of experimental runs of the process using selected initial values for the parameters. The established model being generally nonlinear, optimized parameter values are then derived using an optimization method such as the Multisimplex method described in "Practical Methods of Optimization" J. Wiley & Sons, Chichester, 2d, (1987), which essentially consists of linearizing the behavior functions related to the parameters according to straight lines or planes of different random directions. For any given property behavior relation of n parameters to be optimized in order to either minimize or maximize that behavior relation with or without constraints on the parameter values, a recursive estimation of the property is then performed using an initial set of parameter values according to a selected direction, until the obtained value for the property does not significantly vary in that direction. Then, a last unfavorable set of parameters is used as a new starting point for a following recursive estimation according to a different direction. Successive recursive estimation steps are performed until the resulting value for the property no longer significantly vary in any new direction. When applied to a model comprising a plurality of property behavior relations, the Multisimplex method allows a unique objective function to be created by proper transformation of the relations to adapt to different scales and/or units and by associating a relative importance weight to each property, either subjectively or through fuzzy logic algorithms.

The known optimization processes based on Full Factorial Matrix-Multisimplex methods suffer from several drawbacks. As a general rule, the number of experimental runs required to obtain a model of sufficient reliability is proportional to the total number of significant parameters involved. Therefore, the cost and time frame of the experimental work will therefore be essentially proportional to the number of runs required. Although a variant of the method known as the Fractional Factorial Matrix has been proposed in order to reduce the number of runs to be performed, the provided reduction of experimental runs may not significantly reduce the total cost and time frame of the work required to complete the design of a complex product involving many production technologies. While adequate formulations complying with constraints imposed on the parameter values can nevertheless be obtained, these formulations generally cannot be qualified as optimal when comparing actual property performance with desired property values set forth in the product specifications.

A technique which attempts to improve parameter optimization in process design is disclosed in European Patent Office laid-open patent application publication number 0,430,753 dated Jun. 5, 1991 and in U.S. Pat. No. 5,218,526 issued on Jun. 8, 1993 to Mozzo. According to the technique in Mozzo, from a set of property relations expressed in terms of parameters which is obtained by standard statistical methods using the results of a number of experimental runs of the process, a corresponding set of property relations expressed in terms of weighted parameters is derived. For each actual value of a parameter, a first weighting is expressed as the ratio of: (a) the deviation of the actual value from the mean value of the parameter over the experimental range, on (b) the range between extreme values for that parameter over the experimental range. Then, a goal function is established in term of deviations between weighted values of property values as estimated by the property relations and corresponding weighted values of specified goal values for the properties. For each goal value of a property, a second weighting is expressed as the ratio of: (a) the deviation of the actual value from the mean value of the property over the experimental range, on (b) the range between extreme values for that property over the experimental range. Then, according to a recursive geometric algorithm aimed at successively minimizing the established goal function, a set of optimal parameter values is generated. While being an improvement over the conventional Full/Fractional Factorial Matrix—Multisimplex methods regarding the capability to consider specified goal values for the properties, the weightings as taught by Mozzo do not reflect the relative importance of the properties involved, and that limitation may therefore affect the convergence of the algorithm toward an optimal solution.

A review of modern techniques and software systems for the design of pharmaceutical product formulations is given in "*Intelligent Software System For Pharmaceutical Product*

Formulation" R. C. Rowe, Pharmaceutical Technology, March 1997. In that paper, expert systems, rule induction algorithms, case-based reasoning algorithms, neural networks and genetic networks are presented as modern tools for supporting formulation design, and a number of available software systems using some of these tools are summarized. As indicated in the Rowe paper, although a knowledgeable expert system could be a powerful tool to assist the process designer in the formulation task, its development is generally a high risk, time consuming and expensive process. Rule induction is a knowledge-based algorithm which allows hierarchical classification of objects, using statistical methods which are found generally effective only if the input data is continuous, which is often not the case in practice. Moreover, since rule induction is limited to establishing whether or not a given object is close to another, it generally cannot provide an optimal solution. Case-based reasoning is a knowledge-based iterative technique which can be used to design formulations, which consists of matching the desired specifications for the product with the specifications of the most relevant known formulation(s), and adapting the selected formulation(s) as necessary, followed by an evaluation. Although effective for optimizing the parameters of a variant process from a family of similar processes and corresponding formulations, case-based reasoning generally cannot be used where the design of a significantly different formulation is contemplated. As to neural networks, in which each neuron input is modified by a weight associated with that neuron, they appear to be effective tools for assisting formulation design only in cases where no constraint applies on either the parameter or property values, such cases being rarely found in practice. Finally, regarding the genetics algorithms, they are cyclic methods based on Markov chains for predicting from a starting point a solution likely to result from a sequence of operations, in order to allow making changes to obtain a desired solution. Since these changes are generally made arbitrarily, in most cases, the resulting solution cannot be considered as optimal.

SUMMARY OF THE INVENTION

It is therefore an object of the present invention to provide a systematic method of optimizing parameter values in a process for producing a product which minimizes the number of experimental runs required to obtain an optimal solution complying with the product specifications.

According to the above object, from a broad aspect of the present invention, there is provided a method of optimizing parameter values in a process of producing a product, the process being essentially controlled by a set of n parameters $X_i$ affecting a set of k properties $Y_j$ characterizing the product. The method comprises the steps of: i) assigning values to a set of k property weights $w_j$ representing relative importance of the properties $Y_j$ for the characterization of the product; ii) establishing property behavior mathematical relations giving an estimated property $Ye_j$ for each property $Y_j$ in terms of the parameters $X_i$ from given parameter data and associated property data; iii) using the property weights $w_j$ to establish a goal function in terms of property weighted deviations between the estimated properties $Ye_j$ and corresponding specified goal values for the properties $Y_j$; and iv) optimizing the goal function to generate a set of n optimal parameter values for the parameters $X_i$.

According to a further broad aspect of the present invention, there is provided a method of producing a pharmaceutical product using optimized process parameter values, the process being essentially controlled by a set of n parameters $X_i$ characterizing a formulation for the product, the parameters $X_i$ affecting a set of k properties $Y_j$ characterizing the product. The method comprises the steps of: a) conducting a number of l of experimental runs of the process each using a selected distinct set of values for the parameters $X_i$ covering substantially all extreme values within a chosen range of values for each one of the parameters $X_i$, wherein l is at least equal to n+1 and is substantially less than a number used in the Fractional Factorial Matrix method; b) measuring values for the properties $Y_j$ characterizing the product in each of the l experimental runs, whereby parameter data and associated property data are obtained from the selected distinct set of values for the parameters $X_i$ and the measured values for the properties $Y_j$, respectively; c) determining an importance of the properties $Y_j$ for the characterization of the product, comparing the importance of the properties $Y_j$ relative to one another, and assigning values to a set of k property weights $w_j$ representing a relative importance of the properties $Y_j$ for the characterization of the product; d) calculating a set of optimal parameter values for the parameters $X_i$ using the measured values for the properties $Y_j$ and the assigned values of the set of k property weights $w_j$; and e) producing the pharmaceutical product using the optimized process parameter values $X_i$ calculated in the previous step.

BRIEF DESCRIPTION OF THE DRAWING

The invention will be better understood by way of the following detailed description of a preferred embodiment with reference to the appended drawings, in which.

DETAILED DESCRIPTION OF THE PREFERRED EMBODIMENT

In the following description, a preferred embodiment of the present invention applied to product formulation design will be described. However, it is to be understood that the present invention can be also be used to optimize parameter values of processes related to the production of many types of products which cannot be associated with a formulation, while being characterized by a number of properties affected by process parameters, such as biotechnological products, electronic components, etc.

Figure 1:
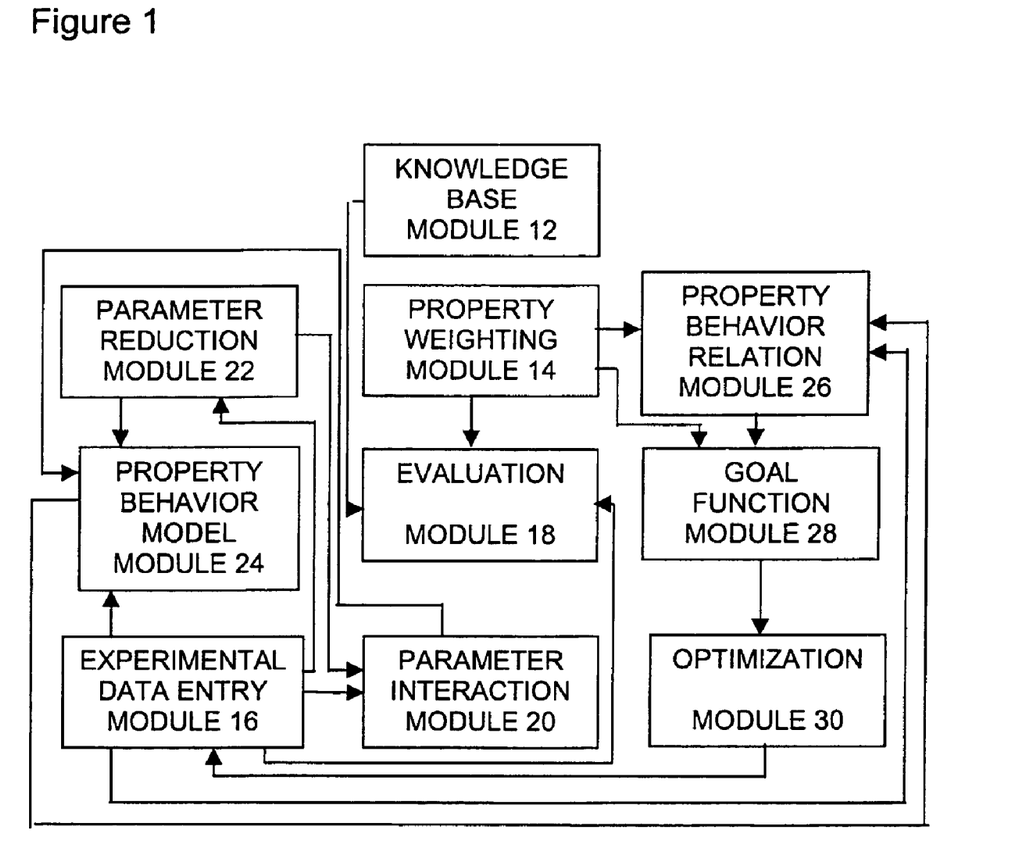
FIG. 1 is a block diagram of a software system that can be used to carry out the method according to the present invention according to the preferred embodiment.

Referring now to FIG. 1, there is generally designated at 10 a computer system which is programmed to carry out a method according to the present invention. The system preferably comprises a knowledge base 12 where prior formulation/process data and competing products data are stored. For the purpose of pharmaceutical formulation design, knowledge base 12 contains process data related to ingredient proportions, experimental conditions and results over time, production technologies used, etc. The system 10 further comprises a property weighting module 14 which generates a weight value for each one of a number k of identified properties according to an initial modeling of the problem and property comparison data presented to the module 14. System 10 further comprises an evaluation module 18 fed by the property weights generated by module 14, to generate a global relative importance vector of dimension [k] for the k properties. System 10 is provided with an experimental data entry module 16 through which property values obtained from experimental runs using different sets of parameter values for the process can be entered and stored for later use by several modules of system 10. Linked to receive data from modules 12, 14 and 16, is an evaluation module 18 which can generates a ranking of the sets of property values selected from the knowledge base and the optimal set of parameter values obtained through optimization. System 10 further comprises a parameters reduction module 22 to retain only those parameters having a significant effect on the considered properties. Module 22 is particularly useful in cases where the number of parameters involved is relatively large, usually greater than 8 where a computer provided with a standard high-performance microprocessor is used. The S-Plus™ statistical software from MathSoft may be used in module 22 to carry out the Stepwise method to select the variables. System 10 is further provided with a parameter interaction module 20, the function of which consists of identifying by statistical analysis from experimental data, which remaining parameters are significantly correlated. The S-Plus statistical software from MathSoft can also be used to program module 20 in which the appropriated correlation methods are applied to the data. It is to be understood that module 20 is unnecessary where all parameters are independent one another.

Modules 16, 20 and 22 are linked to a property behavior models module 24 that uses experimental data, parameter interaction data and remaining significant parameters for determining an optimal mathematical model for each property which is likely to better estimate that property. The model data as generated at module 24 is fed to a property behavior relation module 26 that also receives experimental data from module 16 to statistically estimate polynomial coefficients to be incorporated within the established property behavior models, thereby generating a behavior relation for each property. The S-Plus statistical software from MathSoft may be used to program module 26 to apply the appropriate regression methods to the data System 10 is further provided with a goal function module 28 linked to property weighting module 14 and property behavior relation module 26 to generate, from specified goal values for the properties, a goal function in terms of property weighted deviations between properties as estimated by the behavior relations and the corresponding specified goal values for these properties.

An optimization module 30 is provided to optimize the goal function as established by module 28 through successive iterations and according to the type of each variable (discrete or continuous) and according to one or more ranges specified as constraints imposed on one or more optimal parameter values. Module 30 can be programmed using Matlab™ software supplied by The Math Works Inc to implement network optimization methods. Optimization module 30 is linked to the experimental data entry module 16 to transfer thereto the generated set of optimal parameter values, which module 16 also stores the actual property values obtained from an experimental run based on the set of optimal parameter values. All experimental data is then transferred to the evaluation module 18 as mentioned before.

A preferred embodiment of an optimization method according to the present invention will now be described with reference to FIGS. 1 and 2. As illustrated in the general flow chart shown in FIG. 2, the method comprises a first step 40 of assigning values to a set of k property weights $w_j$ representing relative importance of the k properties $Y_j$ for the characterization of the product, which properties are likely to be affected by the parameters of the process, from a modeling of the problem expressed as a hierarchical tree of these properties. Initial modeling and weight value generation are preferably performed using a method known as analytic hierarchy process (AHP), which was first proposed by T. W. Saâty, and more recently described in "*Using The Analytic Hierarchy Process For Decision Making In Engineering Applications: Some Challenges*" Triantaphyllou et al, International Journal of Industrial Engineering: Application and Practice, Vol. 2, No. 1, pp. 35–44, (1995), which is incorporated herein by reference.

The AHP method consists of building a hierarchical tree from all properties, with one or more hierarchical levels depending on existing relations between the properties. For each level, a pair-wise comparison matrix is built using the properties of this level and presented at an input of the the parameters weighting module 14 shown in FIG. 1, which executes in step 40 in FIG. 2. For each pair-wise comparison, the normalized eigenvector is derived associated with the higher eigenvalue. The components of this eigenvector give the relative importance of each property called the local weight. Finally, the above normalized vectors are combined to find the global weight for each property.

In a parallel direction, each pair-wise comparison is associated with a consistency index reflecting the transitivity relation between all comparison by pairs given by the formulator. Multi-criteria analysis software which is commercially available, such as Expertchoice™, Criterium™ or Ergo™, may be used to program module 14. For example, to one or more m main properties classified at a first (higher) level, may correspond one or more groups of properties classified at a second (lower) level, the latter properties being therefore identified as sub-properties. For each main property associated with a group of p sub-properties, a matrix of dimension [p+1×p+1] is built and filled, as a result of a pair-wise comparison between each property and sub-property, using relative importance values selected from a standard AHP scale. Next, a suitable algorithm performed by parameter weighting module 14 consists of first calculating the higher eigenvalue of the resulting numerical matrix, and then deriving a normalized relative importance vector of dimension [p+1] by an estimation of the left principal eigenvector of that matrix associated with the calculated main eigenvalue of the input matrix. The above algorithm is then applied to compare the m main properties of the higher level, from a pair-wise comparison matrix of dimension [m×m] from which a normalized relative importance vector of dimension [m] is derived. Finally, the above normalized vectors are combined according to the hierarchical relations to generate a global relative importance weight vector for the k properties of dimension [m+Σp] or [k]. In practice, it is generally appropriate to retain only each group of sub-properties without the corresponding main property, the sum of the weights related to the retained k properties/sub-properties being always equal to unity.

According to the next step, namely step 42, parameter data and property data values are provided, which data is obtained from experimental runs using different sets of parameter values for the process, the various values for each parameter being preferably selected according to an expected operation range within which an optimal parameter value is likely to be found. The parameters $X_i$ used in the experimental runs should cover the extremes of the expected operational range for each parameter. Generally, the number of formulation combinations required to determine an optimal formulation depends on many factors among which the more important ones are: 1) the formulation designer experience; 2) complexity of the formulation; 3) the availability of literature and experimental data available on the desired product; and 4) the analytical laboratory workload and throughput. According to the method of the present invention, the minimal number of experimental runs l to perform has been found to be equal to n+1, wherein n is the number of relevant parameters involved. A greater number of runs is certainly possible. Step 42 is performed by experimental data entry module 16 shown in FIG. 1.

The method then comprises a step 44 of establishing property behavior mathematical relations linking the properties with the parameters and interactions thereof, in polynomial form. These property behavior relations provide an estimated property $Ye_j$ for each of the k properties $Y_j$ in terms of a number n of parameters $X_i$ from the parameter data and associated property data provided at step 42. Step 44 is typically comprised of four sub-steps, namely 1) a parameters reduction step performed by module 22, 2) a parameters interaction analysis step performed by module 20, 3) a property behavior modeling step performed by module 24, and 4) a property behavior relations generating step performed by module 26, as shown in FIG. 1. As to sub-step 1), to provide a more efficient algorithm, from an initial number of identified parameters, the most significant parameters, i.e. those significantly affecting each property, are identified to generate a reduced number n of significant parameters, especially where the initial number of identified parameters is greater than 8, as mentioned before. For that purpose, a statistical analysis algorithm can be used, which is based on parameter correlation calculations using parameter and property experimental data provided at prior step 42. Having obtained data related to l experimental runs involving an initial number p of parameters and a number k properties $Y_j$, each correlation factor contained in the correlation matrix is retained as significant whenever it complies with a predetermined condition in the following form:

$$a < \rho_{ij} < b \text{ or } -c < \rho_{ij} < -d \tag{1}$$

wherein a, b, c and d are predetermined limit values, typically set as follows:

$$0.5 < \rho_{ij} < 0.95 \text{ or } -0.95 < \rho_{ij} < -0.5. \tag{2}$$

The parameters associated with the retained correlation factors form the reduced set of n parameters.

It can be also shown that a minimum number l of runs at least equal to n+1 is required to obtain reliable parameters estimation. Then, parameter interactions, that are in the form $X_i X_j$ with i≠j and which are significant, can be identified using the above relations (1), with the suggested specific ranges given in (2). The values for $X_i$ from the l experimental runs are combined with the retained correlation factors $\rho_{ij}$ to form a final matrix W, with each element of the first column being equal to unity for the purpose of following sub-step 4). As to sub-step 3), it consists of establishing, for each property $Y_j$, a best model in terms of retained parameters and parameter interactions. A standard variance analysis is carried out to confirm relevancy of all parameter coefficients and parameter interaction coefficients, and to select by successive variance analysis operations through the use of modules 24, 20 and 22, a suitable model amongst different predetermined models of upgraded degrees, whenever difference in performance between a given model of degree r and a following model of degree r+1 is found to be not significant. The resulting best model is taken along with matrix W and property experimental data in matrix Y, as inputs for following sub-step 4) aimed at generating property behavior relations for each property $Y_j$. A matrix C of coefficient values is given by the matrix:

$$C = (W^T W)^{-1} \times W^T \times Y \tag{8}$$

having a dimension of [m,k], wherein m=n+t+1, t being the number of parameters interactions $X_i X_j$. Hence, estimated property values are given by:

$$Ye = C^T X = \begin{cases} Y_1 = f_1(X_1, \ldots, X_n, \ldots, X_i X_j) \\ \phantom{Y_1} \cdots \\ Y_j = f_j(X_1, \ldots, X_n, \ldots, X_i X_j) \\ \phantom{Y_1} \cdots \\ Y_k = f_k(X_1, \ldots, X_n, \ldots, X_i X_j) \end{cases} \tag{9}$$

Figure 2:
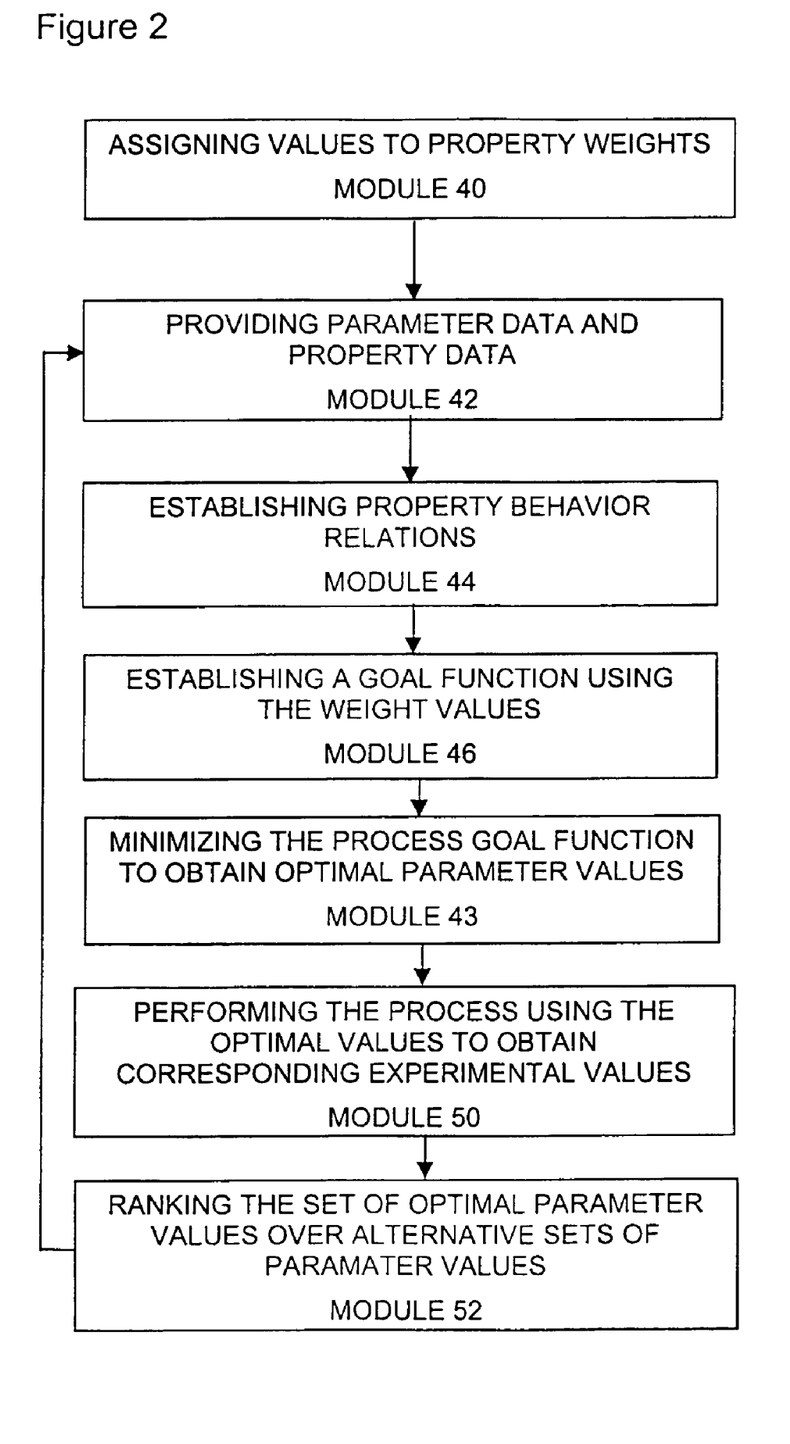
FIG. 2 is a flow chart representing the preferred embodiment of the method according to the present invention.

A following step 46 as shown in FIG. 2 aimed at generating a goal function is carried out by the module 28 shown in FIG. 1, from the set of k property weights $w_j$ produced at step 40, from the property behavior relations produced at step 44 and from the specified goal values for the properties $Y_j$. The basic goal vector can be expressed as follows:

$$g(X_i) = g(X_1, \ldots, X_n, \ldots, X_i X_j) = [w_1(Y_1 - O_1), \ldots, w_k(Y_k - O_k)] \tag{10}$$

wherein $O_i$ is the specified goal values for the properties $Y_i$, with i=1, ..., k.

The goal function to be minimized may be expressed as follows:

$$G(X1, \ldots Xn) = g^T * g = \sum_{i=1}^{k} w_i^2 (Y_i - O_i)^2 \tag{11}$$

which goal function is expressed in terms of property weighted deviations between estimated values $Ye_j$ for the properties $Y_j$ and corresponding specified goal values $O_j$ for the same properties $Y_j$. A next step 48 as shown in FIG. 2 therefore consists of minimizing the goal function G to obtain a set of optimal parameter values for the parameters $X_i$, which step 48 is performed by module 30 shown in FIG. 1. Optimization step 48 generally can consider constraints on the parameter values in the form of one or more ranges, typically in a form $(a_i, b_i)$ wherein $a_i < X_i < b_i$, within which optimal parameter values shall be found, according to the type of each variable (i.e. discrete such as binary values, or continuous).

The "G" goal function is determinated by experimentation. The optimization of the "G" function is a step by step procedure. The first step is to obtain the behavior laws with the best fit between the experimental data and their corresponding ideal value factor.

The second step, the optimization is based on a initial point.

$$X^0 = [X_1^0, X_2^0, \ldots, X_n^0]$$

and $$X^{k=1} = X^k - \alpha H g|_{X = X^k}$$

where
g=∇G=gradientG
H=the Hessian of G

And based on the following goal function, we use the dimension reduction method by successive iterations $$G(X_1, \ldots, X_n) = \sum_{i=1}^{k} [f_i(X_i, \ldots, X_n)]^2$$

these iterations passed by $f_i(X_1, \ldots, X_{n-1})=0$ if i=1, . . . ., k−1 and $X_n = f_k(X_1, \ldots, X_{n-1})$

Now the goal function can be:

$G(X_1, \ldots, X_n) = G(X_1, \ldots, X_{n-1}, f_k(X_1, \ldots, X_{n-1}))$

We observe a perfect overlap between the two goal functions and on the stationary point the goal function will be;

$$\frac{\partial G(X_r)}{\partial X_i} = \left[\frac{\partial G(X)}{\partial X_i} + \frac{\partial G(X)}{\partial X_n}\frac{\partial f_k(X_1, \ldots X_{n-1})}{\partial X_i}\right]_{X_n = f_k(X_1, \ldots, X_{n-1})}$$

These equations supply the maxima and minima of the goal $f_k(X_1, \ldots, X_{n-1})$ functions including the maxima and minima from the starting goal function.

This mathematical approach induces a reduction of the dimension of the variables, consequently we pass from "n" variables to "n−1" variables. In the actual case, we start with the most important variables from the behavior laws with the highest weight values of the property.

This approach is known under the name of network optimization, in this case the network nodes are built by the optimal values of the variable by decreasing order of the property's rank.

After the iterative optimization step 48 is completed, although the set of optimal parameter values $XO_i$ obtained can generally be considered as the solution to recommend, that solution is preferably evaluated amongst other alternative solutions by following steps 50 and 52 as shown in FIG. 2. At step 50, an experimental run of the process is carried out using the obtained set of optimal parameter values, to obtain experimental values for the k properties $Y_i$. The optimal parameter values $XO_i$ and associated experimental property values are then evaluated at step 52 to obtain ranking thereof amongst a number m of other alternative solutions, which may have been selected from knowledge base 12 shown in FIG. 1. This evaluation is preferably performed by a complete AHP process algorithm, using the set of k property weights $w_j$ as previously obtained through step 40.

Concrete Application

An example illustrating an application of the method according to the present invention in the pharmaceutical field will now be described.

Formulation and production process for enalapril maleate tablets were optimized in order to provide a drug product with satisfactory biological performance as well as stability when packaged and stored under ICH (International Conference on Harmonization) conditions. Three (3) independent formulation and process parameters (n=3) were identified as having an impact on the stability of the drug product: 1) the degree of drug neutralization during granulation ($X_1$); 2) the manufacturing technology ($X_2$); and 3) The drug-to-excipient ratio in the formulation, i.e. dose strength ($X_3$).

As to the degree of drug neutralization during granulation ($X_1$), it was classified as either complete, partial or no neutralization. In the case of complete neutralization, the drug and the alkaline agent were both added to the granulation fluid, i.e. water. Therefore, the alkaline agent neutralized the drug prior to its addition to the powder blend for the granulation procedure. In partial neutralization, both the drug and the alkaline agent were added to the powder blend, blended and water added as the granulation fluid for the granulation procedure. When water and/or alkaline agent were not added to the formulation, the drug was not neutralized. The level of water added as well as the drug-to-alkaline agent ratio were kept constant for all of the formulations. The level of the alkaline agent was determined by the stoichiometry of the reaction.

The manufacturing technology ($X_2$) was either wet granulation ($X_2$=0) or direct compression ($X_2$=1). These two technologies are used worldwide for the manufacturing of probably more than 90% of all of the solid oral dosage forms. In the wet granulation technology, the drug and other functional materials added to impart good processing attributes to the drug, often called excipients, are first blended together and agglomerated into larger particles by the addition of a granulating fluid. The role of the granulating fluid is to promote the development of adhesive forces between the materials required for the agglomeration process. After granulation, the granulating fluid is removed by drying. When a direct compression approach is selected as a manufacturing method, the drug is first blended with the excipients and tablets produced without the use of a granulating fluid.

As to the dose strength ($X_3$), four doses of the product were developed, which were obtained by using two formulations with different drug-to-excipient ratios (continuous parameter values) compressed at different tablet weights.

A total of nine (9) experimental runs involving different formulations based on a combination of the three parameters were prepared, as shown in Table 1.

TABLE 1

| Run | $X_1$ | $X_2$ | $X_3$ |
| --- | --- | --- | --- |
| 1 | 1.73 | 1 | 3.33 |
| 2 | 1.73 | 0 | 3.33 |
| 3 | 1.73 | 0 | 3.33 |
| 4 | 0 | 0 | 3.33 |
| 5 | 0 | 1 | 3.33 |
| 6 | 6.9 | 1 | 13.3 |
| 7 | 6.9 | 0 | 13.3 |

TABLE 1-continued

| Run | $X_1$ | $X_2$ | $X_3$ |
|---|---|---|---|
| 8 | 6.9 | 0 | 13.3 |
| 9 | 0 | 0 | 13.3 |

The nine formulations covered all of the six (6) possible combinations for the wet granulation technology and three (3) combinations of direction compression. Tablets were manufactured by using enalapril maleate with USP/NF and EP excipients. In the direct compression technology, there is not a sufficient amount of moisture to dissolve all the drug and alkaline agent and provide for any significant neutralization reaction. However, excipients do contain a certain level of adsorbed free moisture capable of creating a microenvironment where small quantities of the drug and alkaline agent can be dissolved and become available for the neutralization reaction. These phenomena could be responsible for the appearance of physical as well as chemical stability problems and where taken into account by evaluating three (3) formulation combinations. The nine (9) formulation combinations where prepared and the tablets were stored in opened containers at 25° C./60% RH and 40° C./75% RH for a 2-week period. These open container studies are typically conducted during the early formulation development phases of a product to purposely accelerate physical and chemical changes in formulations in order to select the lead candidate, i.e., the formulation with the best stability profile. After the 2-week time period, the tablets were removed from the environmental chambers and sent to the analytical department for their performance evaluation. The performance of the formulations was determined by measuring ten (k=10) properties as a function of time and temperature, which properties were selected as follows, according to a hierarchical tree comprising properties and sub-properties:

Y11, Y12, Y13: % drug dissolved at 5, 15, and 30 min. (sub-properties of Y1);
Y2: % of cyclization product at time zero;
Y31, Y32: % cyclization product after 2 weeks at 25° C./60% RH and at 40° C./75% RH (sub-properties of Y3);
Y4: differential between theoretical and actual assay in mg at time zero;
Y51, Y52: differential between theoretical and actual assay in mg after 2 weeks at 25° C./60% RH and at 40° C./75% RH (sub-properties of Y5);
Y6: % hydrolytic product after 2 weeks at 40° C./75%.

Applying the AHP process with the standard scale for these properties, the decision matrixes given in Table 2 for the properties and in Tables 3, 4 and 5 for the sub-properties were built.

TABLE 2

| Goal | Y1 | Y2 | Y3 | Y4 | Y5 | Y6 |
|---|---|---|---|---|---|---|
| Y1 | 1.0 | (5.0) | (5.0) | 3.0 | 1.0 | (5.0) |
| Y2 |  | 1.0 | (5.0) | 1.0 | (3.0) | (7.0) |
| Y3 |  |  | 1.0 | 7.0 | 1.0 | 1.0 |
| Y4 |  |  |  | 1.0 | (7.0) | (7.0) |
| Y5 |  |  |  |  | 1.0 | (1.0) |
| Y6 |  |  |  |  |  | 1.0 |

TABLE 3

| Y1 | Y11 | Y12 | Y13 |
|---|---|---|---|
| Y11 | 1.0 | 7.0 | 9.0 |
| Y12 |  | 1.0 | 3.0 |
| Y13 |  |  | 1.0 |

TABLE 4

| Y3 | Y31 | Y32 |
|---|---|---|
| Y31 | 1.0 | (5.0) |
| Y32 |  | 1.0 |

TABLE 5

| Y5 | Y51 | Y52 |
|---|---|---|
| Y51 | 1.0 | (5.0) |
| Y52 |  | 1.0 |

From the decision matrixes, the following weight values for the k=10 properties/sub-properties are given in Table 6, the sum of the weights being equal to unity.

TABLE 6

| $\omega_1$ (Y11) | $\omega_2$ (Y12) | $\omega_3$ (Y13) | $\omega_4$ (Y2) | $\omega_5$ (Y31) | $\omega_6$ (Y32) | $\omega_7$ (Y4) | $\omega_8$ (Y51) | $\omega_9$ (Y52) | $\omega_{10}$ (Y6) |
|---|---|---|---|---|---|---|---|---|---|
| 0.060 | 0.011 | 0.005 | 0.098 | 0.046 | 0.230 | 0.039 | 0.034 | 0.171 | 0.305 |

Experimental property data that were obtained from nine (9) runs of the process using the selected nine (9) combinations of parameter values of Table 1, are given in Table 7.

TABLE 7

| Run | Y11 | Y12 | Y13 | Y2 | Y31 | Y32 | Y4 | Y51 | Y52 | Y6 |
|---|---|---|---|---|---|---|---|---|---|---|
| 1 | 90.40 | 102.7 | 102.1 | 0.88 | 1.210 | 15.06 | 0.080 | (0.01) | 0.660 | 4.260 |
| 2 | 91.20 | 95.10 | 95.80 | 0.63 | 1.070 | 3.510 | 0.120 | 0.020 | 0.340 | 5.350 |
| 3 | 86.80 | 100.4 | 101.6 | 0.90 | 0.850 | 0.720 | 0.080 | 0.030 | 0.110 | 3.670 |
| 4 | 94.00 | 96.70 | 97.20 | 0.85 | 1.340 | 16.88 | 0.300 | 0.160 | 0.780 | 2.590 |
| 5 | 75.40 | 106.2 | 107.1 | 0.83 | 1.350 | 22.54 | (0.08) | 0.040 | 0.960 | 3.570 |
| 6 | 94.70 | 98.20 | 98.30 | 0.54 | 1.110 | 8.600 | 0.380 | 0.270 | 2.200 | 6.730 |
| 7 | 90.20 | 98.70 | 98.40 | 0.64 | 1.670 | 5.980 | 0.310 | 0.290 | 1.750 | 7.710 |

TABLE 7-continued

| Run | Y11 | Y12 | Y13 | Y2 | Y31 | Y32 | Y4 | Y51 | Y52 | Y6 |
|---|---|---|---|---|---|---|---|---|---|---|
| 8 | 51.70 | 100.4 | 100.8 | 0.50 | 0.75 | 0.750 | (0.04) | (0.14) | 0.310 | 3.580 |
| 9 | 84.90 | 95.30 | 95.20 | 0.55 | 0.11 | 0.110 | 0.930 | 0.740 | 2.210 | 1.450 |

Since n=3<8, the parameter reduction step is not required for the purpose of the instant case. As to the statistical analysis of parameters interaction, since a correlation factor $\rho_{13}=0.7013$ for the $X_1X_3$ interaction was calculated, that interaction can be considered as significant since the condition $0.5<\rho_{13}<0.95$ is satisfied. The following property behavior relations were established:

$Y11=81.916+4.56X_1+4.074X_2+0.224X_3-0.423X_1X_3;$ $Y12=101.93-1.45X_1+3.81X_2-0.51\ X_3+0.14X_1X_3;$ $Y13=102.16-14.8X_1+3.46X_2-0.52X_3+0.14X_1X_3;$ $Y2=0.92-0.025X_1+0.025X_2-0.028X_3+0.0018X_1X_3;$ $Y31=1.42-0.23X_1+0.057X_2-0.03X_3+0.019X_1X_3;$ $Y32=17.18-8.78X_1+8.15X_2-0.46X_3+0.56X_1X_3;$ $Y4=-0.15+0.0193X_1-0.022X_2+0.08X_3-0.0091X_1X_3;$ $Y51=-0.135-0.028X_1+0.0385X_2+0.066X_3-0.0045X_1X_3;$ $Y52=0.00089-0.256X_1+0.63X_2+0.166X_3+0.008X_1X_3;$ $Y6=3.24+0.9X_1+0.57X_2-0.13X_3-0.02X_1X_3;$ (18)

The specified goal values for the properties as given in Table 8 were used to establish the goal function that was minimized to generate the following set of optimal parameters:

$X_1=3.39$ $X_2=0$ (wet granulation)

$X_3=7.46$ (19)

The associated experimental property values are given in Table 9.

lated, that interaction cannot be considered as significant since $0.5<\rho_{13}<0.95$ is not satisfied. The following property behavior relations were established:

$Y11=85.36+0.99X_1+3.60X_2-0.34X_3;$ $Y12=101.90+0.086X_1+2.30X_2-0.50X_3;$ $Y13=102.87+0.38X_1+0.506X_2-0.58X_3;$ $Y2=1.013+0.001X_1-0.019X_2 0.034X_3;$ $Y31=0.88-0.038X_1+0.36X_2+0.0095X_3;$ $Y32=2.88-2.425X_1+14.33X_2+0.61X_3;$ $Y4=-0.02-0.080X_1-0.0007X_2+0.071X_3;$ $Y51=-0.0568-0.065X_1-0.02X_2+0.06X_3;$ $Y52=-0.4-0.08X_1+0.55X_2+0.2X_3;$ $Y6=2.84+0.68X_1+0.59X_2-0.1X_3.$ (20)

The same specified goal values for the properties as given in Table 8 were used to establish the goal function that was minimized to generate the following set of optimal parameters:

$X_1=3.32$ $X_2=0$ (wet granulation)

$X_3=7.09$ (21)

The associated experimental property values are given in Table 10.

TABLE 8

| $O_1$ (Y11) | $O_2$ (Y12) | $O_3$ (Y13) | $O_4$ (Y2) | $O_5$ (Y31) | $O_6$ (Y32) | $O_7$ (Y4) | $O_8$ (Y51) | $O_9$ (Y52) | $O_{10}$ (Y6) |
|---|---|---|---|---|---|---|---|---|---|
| 100.00 | 100.00 | 85.00 | 0.500 | 0.500 | 0.500 | 0.050 | 0.050 | 0.050 | 1.00 |

TABLE 9

| Y11 | Y12 | Y13 | Y2 | Y31 | Y32 | Y4 | Y51 | Y52 | Y6 |
|---|---|---|---|---|---|---|---|---|---|
| 97 | 104 | 106 | 0.49 | 0.58 | 0.73 | 0.031 | 0.008 | 0.047 | <0.05% |

TABLE 10

| Y11 | Y12 | Y13 | Y2 | Y31 | Y32 | Y4 | Y51 | Y52 | Y6 |
|---|---|---|---|---|---|---|---|---|---|
| 78 | 103 | 106 | 0.51 | 0.55 | 0.73 | 0.034 | 0.04 | 0.029 | <0.05% |

Applying the method for the particular case where only the minimum four (n+1=3+1=4) experimental runs required were used, runs 1, 3, 6 and 9 were selected to provide the parameter and property data as given in Table 7. As to the statistical analysis of parameters interaction, since a correlation factor $\rho_{13}=0.332$ for the $X_1X_3$ interaction was calcu- Comparing the set of parameter values given at (20) with the former set obtained from all nine (9) experimental runs given at (19), it can be noted that both sets are very similar. Actually, from a pharmaceutical standpoint, they could almost be considered as identical.

What is claimed is:

1. A method of producing a composition of matter according to a process essentially controlled by a set of n parameters $X_i$ affecting a set of k properties $Y_j$ characterizing the composition of matter, in which process at least some of said parameters $X_i$ involved exhibit interfering effects on the desired properties $Y_j$, said method comprising:
   i) identifying an expected operational range of said process within which an optimal parameter value is likely to be found for each of said set of parameters $X_i$, and selecting given parameter data for obtaining experimentally associated property data;
   ii) assigning values to a set of k property weights $w_j$ representing relative importance of said properties $Y_j$ for the characterization of said composition of matter;
   iii) establishing a property behavior mathematical relation for each one of said set of k properties $Y_j$ characterizing the composition of matter, said relation giving estimated property values $Ye_j$ for each said property $Y_j$ in terms of said parameters $X_i$ within said range from given parameter data and associated property data;
   iv) using said property weights $w_j$ and said property behavior mathematical relations for said set of k properties $Y_j$ characterizing the composition of matter to establish a goal function in terms of property weighted deviations between the estimated properties $Ye_j$ and corresponding specified goal values for said properties $Y_j$;
   v) minimizing the goal function to generate a set of n optimal parameter values for said parameters $X_i$, wherein said property behavior mathematical relations for said set of k properties $Y_j$ characterizing the composition of matter are sufficient for the purposes of establishing said goal function; and
   vi) using said set of optimal parameter values in said process to produce said composition of matter.

2. A method according to claim 1, wherein said set of optimal parameter values characterizing an optimal formulation for the composition.

3. A method according to claim 2, wherein said composition of matter is a pharmaceutical product, said set of optimal parameter values characterizing an optimal formulation for the pharmaceutical product.

4. A method according to claim 1, wherein the values for said property weights $w_j$ are obtained using an algorithm based on an analytic hierarchy process.

5. A method according to claim 4, wherein said given property data are obtained through a number l of experimental runs of said process using said given parameter data, each said run using a distinct set of values for said given parameter data.

6. A method according to claim 5, wherein said number of experimental runs of said process each uses a selected distinct set of values for said parameters $X_i$ covering substantially all extreme values within a chosen range of values for each one of said parameters $X_i$, wherein l is at least equal to n+1 and is substantially less than a number used in the Fractional Factorial Matrix method.

7. A method according to claim 3, wherein the values for said property weights $w_j$ are obtained using an algorithm based on an analytic hierarchy process.

8. A method according to claim 7, wherein said given property data are obtained through a number l of experimental runs of said process using said given parameter data, each said run using a distinct set of values for said given parameter data.

9. A method according to claim 8, wherein said number of experimental runs of said process each uses a selected distinct set of values for said parameters $X_i$ covering substantially all extreme values within a chosen range of values for each one of said parameters $X_i$, wherein l is at least equal to n+1 and is substantially less than a number used in the Fractional Factorial Matrix method.

10. A method according to claim 1, wherein said goal function is expressed as follows:

$$G(X_i, \ldots X_n) = \sum_{j=1}^{k} w_j^2 (Ye_j - O_j)^2$$

wherein $O_j$ are said specified goal values for said properties $Y_j$.

11. A method according to claim 10, wherein said minimizing step is performed by successive iterations of:

$$G(X_1, \ldots, X_n) = \sum_{i=1}^{k} [f_i(X_i, \ldots, X_n)]^2.$$

12. A method according to claim 11, wherein said goal function is minimized according to one or more specified ranges ($a_i$, $b_i$) wherein $a_i < X_i < b_i$ for one or more of said optimal parameter values.

13. A method according to claim 1, further comprising the steps of:
    performing experimentally said process using said set of optimal parameters values to obtain corresponding experimental values for said properties $Y_j$;
    ranking said set of optimal parameters values over predetermined alternative sets of parameters values for said $X_i$.

14. A method according to claim 13, wherein said ranking step is performed using an algorithm based on an analytic hierarchy process.

15. A method according to claim 13, further including the step of:
    incorporating said set of optimal parameters values and said corresponding experimental values for said properties $Y_j$ respectively into said given parameter and associated property data;
    repeating said steps iii) to v) to generate a new set of optimal parameters values for said parameters $X_i$.

16. A method of producing a composition of matter using optimized process parameter values, said process being essentially controlled by a set of n parameters $X_i$ characterizing a formulation for said product, said parameters $X_i$ affecting a set of k properties $Y_j$ characterizing the product, in which process at least some of said parameters $X_i$ involved exhibit interfering effects on the desired properties $Y_j$, said method comprising:
    conducting a number of l of experimental runs of said process each using a selected distinct set of values for said parameters $X_i$ covering substantially all extreme values within a chosen range of values for each one of said parameters $X_i$, wherein l is at least equal to n+1 and is substantially less than a number used in the Fractional Factorial Matrix method, said chosen range corresponding to an expected operational range of said process within which an optimal parameter value is likely to be found for each of said set of parameters $X_i$;

measuring values for said properties $Y_j$ characterizing the composition of matter in each of said l experimental runs, whereby parameter data and associated property data are obtained from said selected distinct set of values for said parameters $X_i$ and said measured values for said properties $Y_j$, respectively;

determining an importance of said properties $Y_j$ for the characterization of said composition of matter, comparing said importance of said properties $Y_j$ relative to one another, and assigning values to a set of k property weights $w_j$ representing a relative importance of said properties $Y_j$ for the characterization of said composition of matter;

establishing property behavior mathematical relations giving estimated property values $Ye_j$ for each said property $Y_j$ in terms of said parameters $X_i$ within said chosen range from said parameter data and associated property data;

using said property weights $w_j$ and said property behavior mathematical relations for said set of k properties $Y_j$ characterizing the composition of matter to establish a process goal function in terms of property weighted deviations between the estimated properties $Ye_j$ and corresponding specified goal values for said properties $Y_j$, wherein said property behavior mathematical relations for said set of k properties $Y_j$ characterizing the composition of matter are sufficient for the purposes of establishing said goal function;

minimizing the process goal function to generate a set of optimal parameter values for said parameters $X_i$, and producing said composition of matter using said optimized process parameter values $X_i$ calculated in the previous step.

17. A method according to claim 16, wherein said composition of matter is a pharmaceutical product, and said process is a formulation of said product.

18. A method according to claim 17, wherein the values for said property weights $w_j$ are obtained by an algorithm based on an analytic hierarchy process.

19. A method according to claim 16, wherein l=n+1.

20. A method according to claim 18, wherein l=n+1.

21. A method according to claim 17, wherein said goal function is expressed as follows:

$$G(X_i, \ldots X_n) = \sum_{j=1}^{k} w_j^2 (Ye_j - O_j)^2$$

wherein $O_j$ are said specified goal values for said properties $Y_j$.

22. A method according to claim 21, wherein said minimizing step is performed through successive iterations.

23. A method according to claim 22, wherein said goal function is minimized according to one or more specified ranges ($a_i$, $b_i$) wherein $a_i < X_i < b_i$ for one or more of said optimal parameters values.

24. A method according to claim 17, further comprising the steps of:

performing experimentally said process using said set of optimal parameters values to obtain corresponding experimental values for said properties $Y_j$;

ranking said set of optimal parameters values over predetermined alternative sets of parameters values for said $X_i$.

25. A method according to claim 24, wherein said ranking step is performed through an algorithm based on an analytic hierarchy process.

26. A method according to claim 17, further including the steps of:

incorporating said set of optimal parameters values and said corresponding experimental values for said properties $Y_j$ respectively into said given parameter and associated property data;

repeating said steps of conducting, measuring, establishing, using and minimizing to generate a new set of optimal parameters values for said parameters $X_i$.

* * * * *